(12) United States Patent
Gilbert

(10) Patent No.: US 8,783,054 B2
(45) Date of Patent: Jul. 22, 2014

(54) INDIRECT EVAPORATIVE COOLER CONSTRUCTION

(75) Inventor: Robert William Gilbert, Willunga (AU)

(73) Assignee: F.F. Seeley Nominees Pty. Ltd. (AU)

( * ) Notice: Subject to any disclaimer, the term of this patent is extended or adjusted under 35 U.S.C. 154(b) by 254 days.

(21) Appl. No.: 13/142,901

(22) PCT Filed: Nov. 10, 2009

(86) PCT No.: PCT/AU2009/001463
§ 371 (c)(1),
(2), (4) Date: Jun. 30, 2011

(87) PCT Pub. No.: WO2010/054426
PCT Pub. Date: May 20, 2010

(65) Prior Publication Data
US 2011/0302946 A1    Dec. 15, 2011

(30) Foreign Application Priority Data
Nov. 13, 2008    (AU) ................ 2008905875

(51) Int. Cl.
*F28D 5/00*       (2006.01)
*F25D 23/12*      (2006.01)
*F28C 1/00*       (2006.01)
*F25B 47/00*      (2006.01)
*F25D 21/00*      (2006.01)
*F28B 1/00*       (2006.01)
*A23C 3/04*       (2006.01)

(52) U.S. Cl.
USPC ............. 62/304; 62/259.4; 62/314; 62/315; 62/280; 62/150; 165/110; 165/115; 165/116

(58) Field of Classification Search
CPC ............. F24F 5/0035; F24F 6/02; F24F 6/14; F24F 6/16; F24F 13/12; F28G 1/16; F28G 1/163; F28G 1/166; F28C 3/08
USPC ................ 62/304, 259.4, 314, 315, 280, 150; 165/110, 115, 116
See application file for complete search history.

(56) References Cited

U.S. PATENT DOCUMENTS

| 4,630,674 | A | * | 12/1986 | Skoog ........................ 165/147 |
| 4,660,390 | A | | 4/1987 | Worthington |
| 4,977,753 | A | | 12/1990 | Maisotsenko et al. |
| 5,349,829 | A | | 9/1994 | Tsimerman |
| 5,722,251 | A | | 3/1998 | Dintcyn et al. |

(Continued)

FOREIGN PATENT DOCUMENTS

| EP | 0773412 A | 5/1997 |
| FR | 2238121 A1 | 2/1975 |

(Continued)

*Primary Examiner* — Frantz Jules
*Assistant Examiner* — Erik Mendoza-Wilkenfe
(74) *Attorney, Agent, or Firm* — Tarolli, Sundheim, Covell & Tummino LLP

(57) ABSTRACT

A counter flow indirect evaporative heat exchanger (10) having vertically stacked alternate counter flow wet (14) and dry (12) passages where the wet passages are wetted during operation of the heat exchanger by wetting means (50, 52, 53, 54, 70, 72, 74, 76) travelling vertically of the stack. Elongately wetting of a small plurality of the total number of passages (14, 12) of the heat exchanger (10) occurs at a time during vertical travel of the wetting means.

6 Claims, 5 Drawing Sheets

(56) References Cited

U.S. PATENT DOCUMENTS

| | | |
|---|---|---|
| 5,800,595 A | 9/1998 | Wright |
| 5,919,406 A * | 7/1999 | Bachofen .................. 261/153 |
| 5,927,097 A | 7/1999 | Wright |
| 6,523,604 B1 | 2/2003 | Brookes et al. |
| 6,581,402 B2 | 6/2003 | Maisotsenko et al. |
| 2004/0061245 A1 | 4/2004 | Maisotsenko et al. |
| 2004/0226698 A1 | 11/2004 | Reinders |
| 2008/0047686 A1 * | 2/2008 | Reinders et al. ............ 165/60 |

FOREIGN PATENT DOCUMENTS

| | | |
|---|---|---|
| FR | 7424874 | 2/1975 |
| WO | 9941552 A1 | 8/1999 |
| WO | WO 2006/074508 A1 | 7/2006 |
| WO | WO 2006074508 A1 * | 7/2006 |

* cited by examiner

INDIRECT EVAPORATIVE COOLER CONSTRUCTION

CROSS REFERENCES TO RELATED APPLICATIONS

The present application is a 35 U.S.C. §371 National Stage Patent Application International PCT Application Serial Number PCT/AU2009/001463 having an International filing date of 10 Nov. 2009, which claims priority to Australian Patent Application Serial No. 2008905875 that was filed on Nov. 13, 2008. This Application claims priority to and incorporates by reference the above applications in their entirety for all purposes.

TECHNICAL FIELD

The present invention relates to methods, equipment and systems for ventilating and cooling of enclosed spaces. In particular, this invention relates to counter flow indirect evaporative heat exchangers for evaporative coolers; for example, self contained air-conditioning units suitable for supplying cooled air to an enclosed space and also to self contained conditioning units suitable for supplying cooled water for use in heat exchange units forming part of a system for the cooling of enclosed spaces.

BACKGROUND ART

Throughout this description and the claims which follow, unless the context requires otherwise, the word "comprise", or variations such as "comprises" or "comprising", will be understood to imply the inclusion of a stated integer or step or group of integers or steps.

The reference to any prior art in this specification is not, and should not be taken as, an acknowledgement or any form of suggestion that that prior art forms part of the common general knowledge in Australia.

The principles of indirect evaporative cooling have been well known for many years. Early references to the principle of pre-cooling air through a combination of heat exchange and evaporation prior to evaporative cooling include SU 979796 by Maisotsenko. These principles have been exploited in a number of practical applications as shown in, say, U.S. Pat. No. 4,977,753 by Maisotsenko, and as further refined in U.S. Pat. No. 6,581,402, US Application 2004/0226698 by Reinders and in PCT/AU2006/000025 by James.

The practical devices as shown in the aforementioned disclosures present a number of difficulties to be ameliorated before those devices can operate to a standard that is satisfactory for a commercially viable product.

Of great practical importance in the provision of coolers is their size and shape which must be such as to fit and blend into the surroundings of, say, a domestic dwelling. While it has been traditional to mount direct evaporative coolers on rooves, the additional size and weight of indirect coolers of the same cooling capacity make this approach impractical. A similar problem presents itself when the working models of indirect evaporative coolers are positioned at ground level around the outside of a dwelling. The cooler may have a plan area which can be too large and use too much of the available space between, say, the wall of a building and a boundary fence.

Marketing of indirect evaporative coolers would be greatly enhanced if a cooler could be fitted into a package to be mounted against the outside wall of a dwelling and had dimensions which satisfied the following criteria:

A depth as small as practicable from the wall to the outside of the cooler.
A width limited by handling considerations.
A height only limited by clearance to the underside of any overhanging roof/eave members.

An ideal configuration, consistent with technical requirements for its operation and, considering the above, would typically project from a wall, against which it is mounted, a distance of no more than about 600 mm, a width of up to 900 mm and height limited to about 2100 mm.

The construction of a cooler within these parameters requires a radical departure from previously disclosed constructions of those devices. In all previous disclosures, certain dimensions of the heat exchanger core are defined by technical and/or practical restraints with only one dimension being able to be varied to increase the capacity of the heat exchanger.

The Maisotsenko device shown in U.S. Pat. No. 6,581,402 has a heat exchanger width and depth restrained by air flow and resistance considerations where capacity is determined by the height of the exchanger. The configurations of Reinders and James have the depth and height of the heat exchanger determined by technical considerations, while the width determines the capacity of the device. We believe that if the favourable characteristics of each of these configurations could be combined into a device, then a much more practicable indirect cooler could be developed for the marketplace.

However, each of the previously disclosed configurations has other technical and practical difficulties which make a ready combination of their advantages somewhat problematic.

The device disclosed in U.S. Pat. No. 6,581,402 requires horizontal heat exchanger plates with a wettable surface on one side and an impervious surface on the other. Water distribution throughout the wettable surface relies on a wickable media distributing water from a central trough with a combination of wicking along the surface and some gravitational assistance from a slight decline from the horizontal. Cooling to a low temperature requires water flow through the wetted surface to be as low as possible, and preferably just sufficient to replace the loss due to evaporation. Flushing of the wettable surfaces to remove any accumulation of salts left behind by evaporating water is not possible without significant degradation of the thermal performance of the air conditioner.

The Maisotsenko configuration, which progressively transfers a percentage of cooled air from the dry passage to the wet passage to provide evaporative cooling, compromises the temperature of the delivered air relative to other configurations, since the transferred air cannot be subjected to the full temperature difference offered by the heat exchanger.

The configuration offered by Reinders fully exploits the original principles of indirect evaporative cooling, but the heat transfer performance of the heat exchanger is compromised by its layout and construction. Heat transferring from the wet passage side to the dry passage side has to travel through relatively long distances of heat exchanger material, necessitating the use of high conductivity materials such as metals to achieve reasonable performance.

In both of the configurations used by Reinders and James, water distribution to the heat exchanger core is by irrigation of the top surface of the core, allowing water to flow down through the core to be collected in a reservoir below the core. This water flow through the core must be kept to a minimum while the cooler is in operation since any excess water flow over that required for evaporation will compromise the temperatures of the usable conditioned air that can be delivered by the cooler. The water flow requirement for thermal performance desirably includes the capability for it to flush residual salts from the core surfaces. A reasonable, practical compromise utilised by both Reinders and James is to periodically wet the core with an excess of water to flush out residual salts and fill the water retaining capability of the materials used to form the wet channels, followed by relatively long periods of operation without wetting. During this period, evaporation still takes place from water held in the wetted surfaces and full thermal performance of the cooler is achieved. This solution works well provided the wetting period is short, and the period between wettings is long.

An alternative revealed by James is to divide the core into separately wetted segments, each segment with its own, thermally separated, water circuit (pump, reservoir and distributor). This method allows for constant flushing of the core without degradation of thermal performance. While this alternative has been demonstrated to work in practical models, it is difficult to implement in viable production models.

A preferred solution is therefore to periodically wet the wet passages of the core with periods as long as possible between wettings to allow evaporation to take place and maximise the cooling capacity of the heat exchanger. This ideal becomes more difficult as the height of the heat exchanger is increased to take advantage of the preferred configuration of the overall indirect evaporative cooler. Water can only be added to the top of the core at a rate determined by the time it takes to trickle down through the wet passages. The wetting cycle must continue until water has spread through most of the vertical distance of the core, and to then be cut off allowing the excess water to flow all the way through the core and back to the reservoir. The cooling effect of the heat exchanger is compromised all the time that water is flowing through the wet passages, and only reverts to maximum cooling when all water flow has stopped. The taller the core, and hence the longer the wet passages, the longer will be the period required for wetting and the greater the proportion of time during which cooling is compromised. This situation becomes untenable with cores as tall as those required for the preferred geometry described above.

SUMMARY OF INVENTION

The present invention proposes an amelioration of the problems associated with the prior art by constructing a heat exchange core wherein the wet and dry passages are mounted near to horizontal and stacked alternately one above the other, and wherein there is provided an alternative method and means for periodically wetting the wet passages of the core.

In accordance with a first aspect, the present invention provides a counter flow indirect evaporative heat exchanger wherein vertically adjacent counter flow wet and dry passages are, when in situ, horizontal or near to horizontal and the wet passages are adapted to be wetted by wetting means which sequentially applies water elongately to the wet passages across the height of the heat exchanger.

Preferably the wet and dry passages are constructed from corrugated sheets with one side comprising a wettable and absorbent medium and the other side comprising a water impermeable surface, membrane or layer.

In one embodiment, the wet and dry passages are constructed from a wettable and absorbent cellulose base with an impermeable membrane applied to one surface.

In an alternative embodiment, the wet and dry passages are constructed from a water impermeable formed sheet to which is applied a water absorbent media to one surface of the sheet.

In a further embodiment the corrugated sheets to make each passage are assembled such that the corrugations of vertically adjacent sheets intersect at an angle in the range of 20° to 70°.

In a still further embodiment, the corrugated sheets of the top and bottom of each passage are divided into two parts symmetrically about a centre-line substantially parallel to the mean airflow direction in each passage, with the corrugation angle in one part set at a complementary angle to the corrugation angle in the adjacent part.

In a further enhancement, the corrugated sheets are constructed with the corrugations set in a herringbone angular pattern symmetrical about a centre line of each respective sheet.

In another embodiment, the wetting means includes a water delivery device adapted to travel generally vertically of the heat exchanger for delivering water directly into a small number of the wet passages at one time along an air delivery face of the heat exchanger.

In yet another embodiment, said water delivery device comprises a plurality of slotted tubes placed vertically along the delivery face of the heat exchanger with the slotted side of the tubes adjacent to the heat exchanger. In operation, a plunger is traversed up and down the slotted tube, while water is delivered into the tube from the top. Water is thereby delivered to the wet passages immediately adjacent to the position of said plunger. In a further enhancement, the heat exchanger is constructed with a cavity space available for the incorporation of the slotted tubes so as to contain water delivered from the slot to the heat exchanger passages.

One preferred form of desired wetting mechanism comprises a vertically traveling water spreader which wets a small plurality of passages of the core at the one time relative to the total number of passages of the core while undergoing movement to adjacent sections of the core until a complete wetting cycle of the core is completed. Preferably, vertical movement of the wetting mechanism between adjacent horizontal passages of the core is continuous. While a traveling water spreader is wetting a particular plurality of wet passages, the cooling efficiency of those passages is compromised by the flow of water therein. However, since the number of passages wetted at any one time is only a small proportion of the total number of wet passages in the whole core, the compromise to overall cooling is limited. The use of this mode of wetting allows heat exchange cores to be constructed with only structural or mechanical constraints as to height, thereby providing the flexibility required to provide an indirect evaporative cooler within desired size and shape constraints.

In another aspect of the present invention there is provided an evaporative cooler having a counter flow indirect evaporative heat exchanger in accordance with the first aspect.

A still further aspect of this invention provides a method of operating a counter flow indirect evaporative heat exchanger having a vertical stack of alternate substantially horizontal wet and dry passages in accordance with the first aspect.

The construction of heat exchanger passages particularly suited for use in embodiments of the present invention includes corrugated sheets with a wettable surface and a water impermeable surface, with corrugation angles set at opposing angles as described in PCT/AU2006/000025, which disclosure is incorporated herein by reference. It will, however, be understood by a person skilled in the art that the principles of the present invention could equally be applied to other methods of construction of heat exchanger stacks or cores.

BRIEF DESCRIPTION OF THE DRAWINGS

The present invention will now be described by way of example with reference to the accompanying drawings, in which:—

BEST MODES

Figure 1:
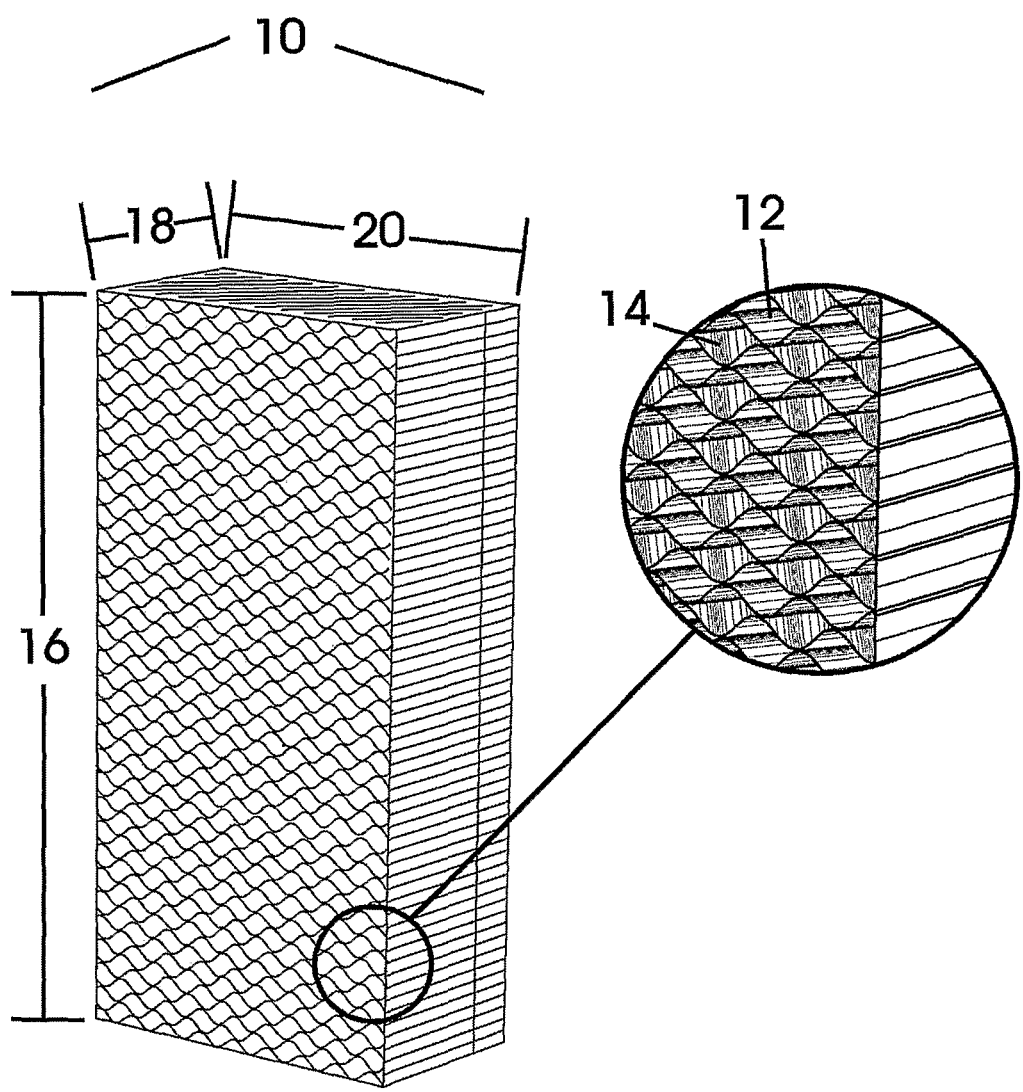
FIG. 1 is an isometric view of a heat exchanger core of an indirect evaporative cooler as suited to an embodiment of this invention which has the proportions of being relatively tall compared to the plan dimensions thereof.

In FIG. 1, the aspect ratio of the dimensions of heat exchanger core 10 are such as to fit the preferred requirements of an indirect evaporative cooler. Dimension 16 is large compared to the dimensions 18 and 20. Typically, dimension 16 will be about 1,500 mm, dimension 20 about 900 mm and dimension 18 about 400 mm. Both the dry passages 12 (shown with horizontal shading) and wet passages 14 (shown with vertical shading) are orientated to be essentially horizontal, although it may be beneficial that they be slightly off horizontal to aid the distribution of water in the wet channels and the removal of excess water.

Figure 2:
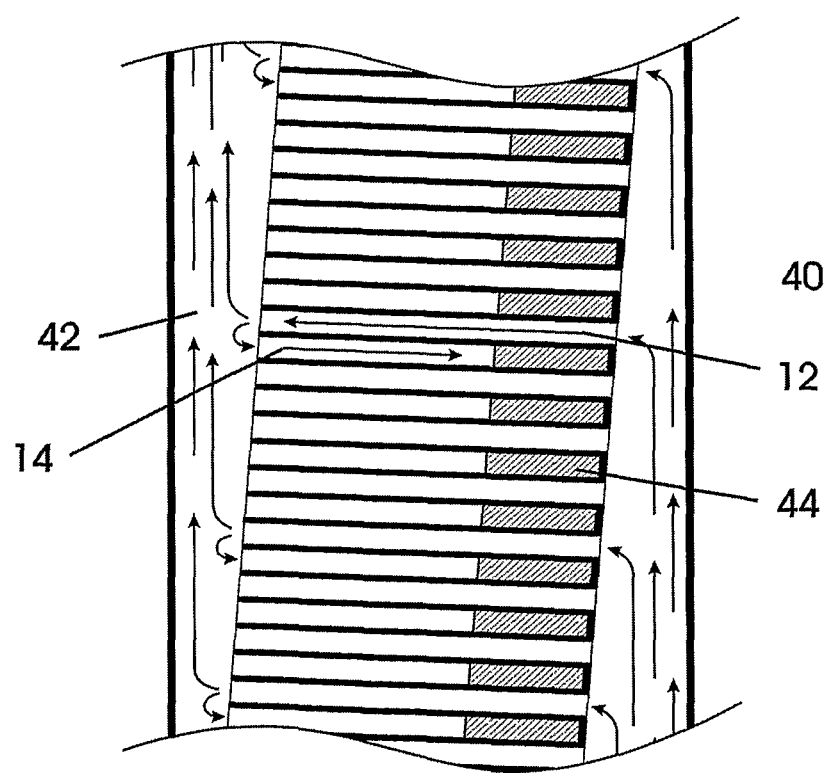
FIG. 2 shows a side elevation view of adjacent corrugated sheets in a heat exchanger having uniform corrugations.

In FIG. 2, the heat exchanger 10 is shown in front elevation with dry passages 12 and wet passages 14 orientated to be horizontal in use. Hot, dry intake air enters the dry passages 12 of the heat exchanger from side 40 and leaves from side 42 as cooled air. A proportion of air enters the wet passages 14 from side 42 to flow back along the wet passages until it enters exhaust space 44, from which it is exhausted to atmosphere. This flow path through the core produces a useable stream of cool air from side 42 being the proportion of air not passing back through the wet passages 14 to be exhausted via space 44. The means by which this arrangement cools the stream of useable air is described in previous publications, in particular see PCT/AU2006/000025.

Figure 3:
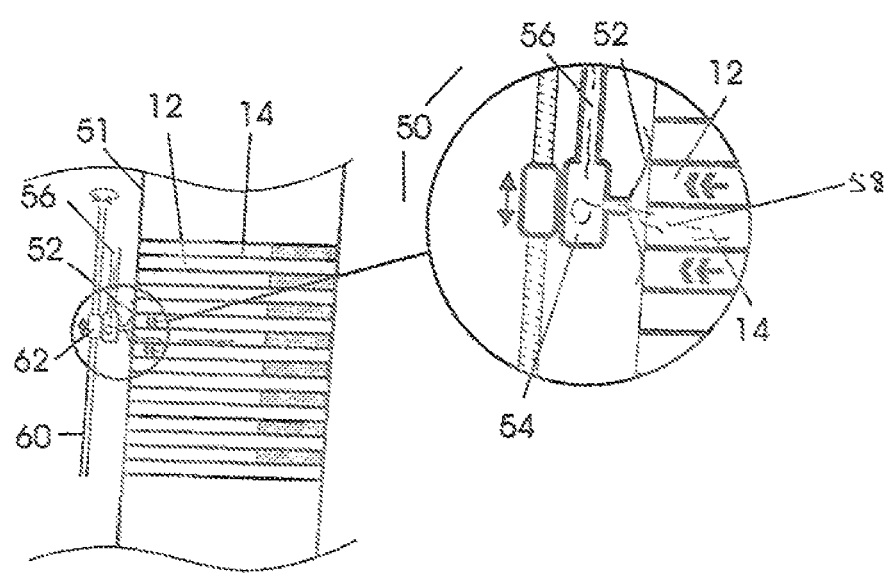
FIG. 3 is a side elevation view of a heat exchanger core with a first water distribution mechanism.

In FIG. 3, a traversing water distribution mechanism is shown with shrouds 52 covering a proportion of the delivery side of the heat exchanger 10, in operation, cooled air travels through the dry channels 12 of the heat exchanger 10, exiting along face 51. In normal operation, a proportion of the air exiting from dry channel 12 is diverted to wet channel 14, the remainder of the cooled air from dry channel 12 is available as useful air to be delivered by the cooler. However, when the shrouds 52 of the water delivery mechanism 50 are covering a small number of the wet and dry channels on the delivery side, the air cannot split into 2 streams as in normal operation. The static pressure in dry channel 12 will always be relatively high since the dry channel is connected directly to the space to be cooled which is pressurised by a fan (not shown). When air flow is interrupted by the shrouds 52, the static pressure in the wet channel 14 will drop since the wet channels are directly connected to the exhaust area of the heat exchanger, which is at normal atmospheric pressure. The end result of the interruption of flow by the shrouds 52 is that there will be an accelerated flow of air from the dry channel 12 to the adjacent wet channel 14 within the confines of the shrouds 52.

Water delivered via conduit 56 to water nozzle 54, which is part of the traversing water distribution mechanism 50, injects a water spray 58 into the accelerated air flow described above. The water thus sprayed can only flow through the wet channel 14, since the static pressure differences created by the shrouds 52 ensure that all air must flow from the dry channel to the wet channel. Thus all water sprayed is available to wet the wet channel 14, and water entering wet channel 14 is distributed throughout the wet channel by the accelerated air flow therein.

Since the wet channels necessarily need to be periodically wetted, the water distribution mechanism must be traversed vertically up and down along the cooled air delivery face 51 of the heat exchanger. By this means, a small number of wet channels are wetted at a time, with the means of wetting moving on to adjacent channels until the entire face has been traversed and all wet channels have been wetted.

One method of traversing the water distribution mechanism is illustrated in FIG. 3. The water distribution mechanism is attached to a threaded nut 62, which runs on an extended screw 60. When the screw 60 is driven in reciprocal directions by a driving means (such as an electric motor, not shown), the water distributing mechanism will move over the delivery face of the heat exchanger.

Figure 4:
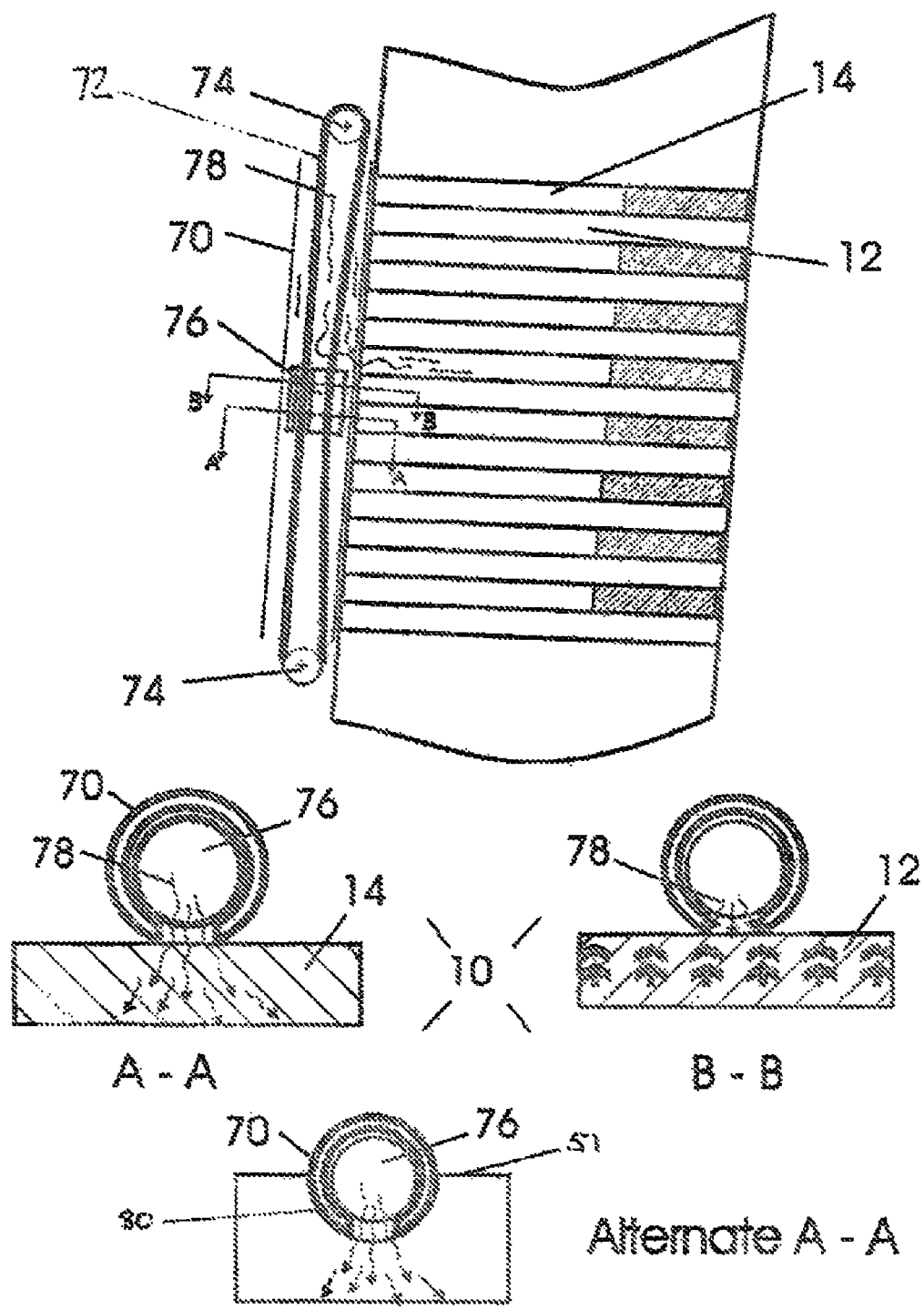
FIG. 4 is a view similar to that of FIG. 3 but showing details of a second water distribution mechanism.

An alternative water distribution mechanism is illustrated in FIG. 4. Water is conducted through a hollow conduit 70, which has a slot along its length on the side facing the delivery face of the heat exchanger 10. Inside the hollow conduit 70 is a sliding plug 76, held in position by a continuous belt or chain 72. Flexible belt 72 is positioned by capstans 74, driven by, say, an electric motor such that the drive of the capstan causes the sliding plug 76 to move up and down within conduit 70.

In operation, water 78 is directed down the conduit 70 from the top. The water 78 flows down conduit 70 until it impacts on sliding plug 76. The sliding plug 76 diverts the water flow through the slot in conduit 70 at the position of sliding plug 76. Since the slot of conduit 70 is positioned against the delivery face of heat exchanger 10, as shown in Section A-A, the water so diverted will impinge on a small proportion of both the wet and dry channels at the position of the plug 76. Since air is flowing out of the dry channels and into the wet channels along the delivery face of heat exchanger 10, the water diverted onto the delivery face of heat exchanger 10 will tend to flow into the wet channels only, thereby providing the means of wetting the internal surfaces of the wet channel. The effect at the dry channel, wherein no water flows against the direction of air flow is shown in Section B-B. As sliding plug 76 progresses up and down the face of heat exchanger 10, all the wet channels will be progressively wetted during a wetting cycle.

A preferred arrangement for transmitting water diverted by plug 76 into the heat exchanger 10 is illustrated in section Alt A-A. In this arrangement, heat exchanger 10 is constructed with notches 80 on the delivery face 51 such that the slot in conduit 70 is contained within the notch of the heat exchanger. The water delivered to the heat exchanger by the sliding plug 76 is contained within the notch 80 greatly reducing the tendency to spray water into the delivered air space (42 in FIG. 2) when it impacts the delivery face of the heat exchanger at high velocity.

The method and means of applying water to the wet channels of the heat exchanger described above are designed to apply water to the wet channels at a rate much greater than is actually required for evaporation. Such a high flow rate is required for the purposes of flushing salt deposits and contaminants from the surfaces of the wet channels, and to ensure that all the internal surfaces of the wet channels are indeed wetted. This introduces a practical problem with the channels of the heat exchanger being horizontal, and constructed from corrugated paper set at an angle to the air flow as described in PCT/AU2006/000025. The angle of the corrugations tend to bias all the water flow (which tends to cling to the lower surfaces of the channels) in the direction of the angle of the corrugation. Since the wet and dry channels alternate the angles of the corrugations, the net result is that all the lower surfaces of the wet channels have corrugations in the same direction and tend to direct the water in the channel to one side only. This results in difficulty in wetting the wet channels uniformly and leads to an excess of water exiting through the exhaust space 44 on one side only rather than distributing the excess water through both of the exhaust spaces.

Figure 5:
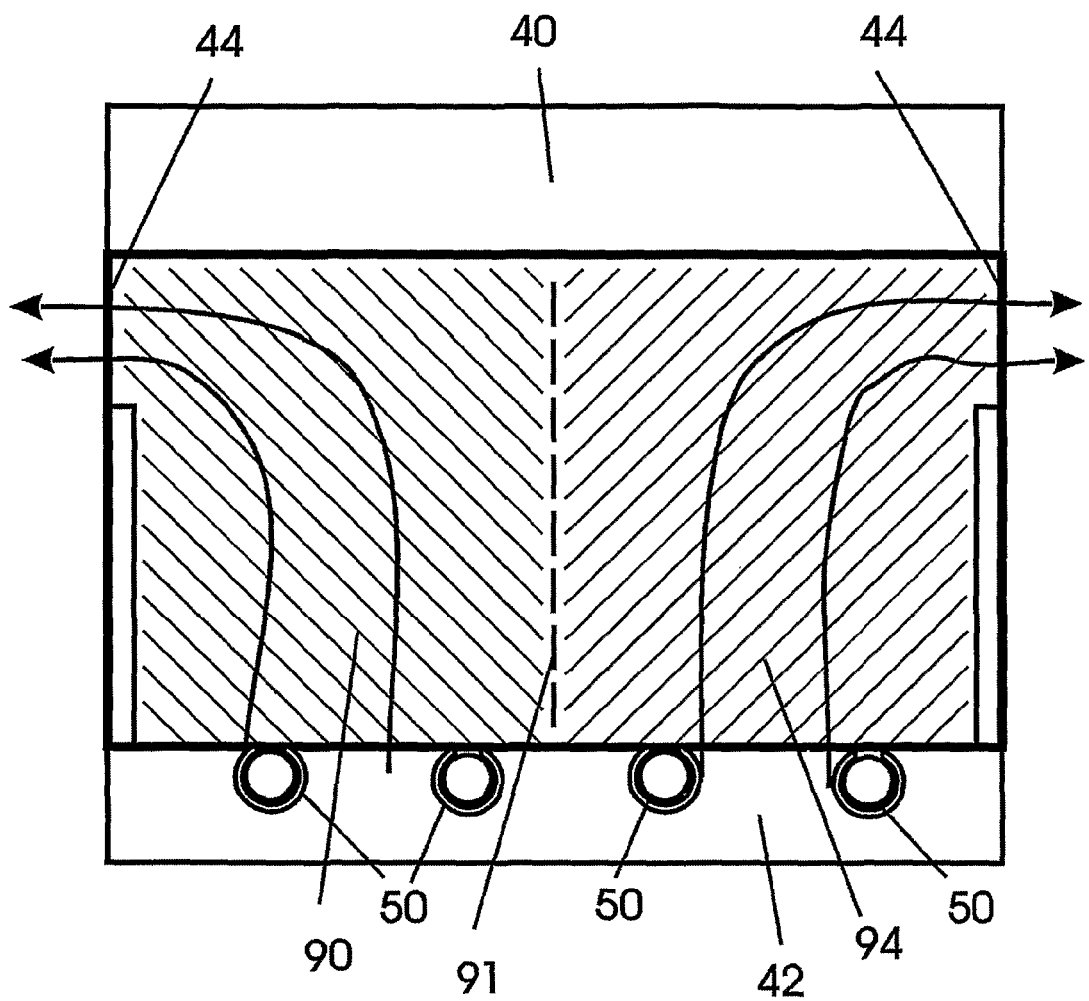
FIG. 5 is a sectioned plan view through a heat exchanger stack or core showing an alternate layout of corrugations for a wet channel in the form of a herringbone pattern.

These difficulties can be greatly relieved by adopting a construction of the layers of the heat exchanger core as illustrated in FIG. 5. FIG. 5 shows a single sheet of the heat exchanger core wherein the pattern of corrugations follows a "herringbone" shape. Corrugations are set at an angle to the airflow (depicted by arrowed lines) as indicated by ridges 90 on one side of the sheet. Symmetrical about centreline 91, the angle of corrugations on the other side of line 91 are the mirror image as indicated by ridge line 94. Successive sheets in the heat exchanger stack are placed in the opposite direction such that the corrugation ridges intersect each other at an angle. In operation, if the illustration of FIG. 5 represents the bottom sheet of a wet channel, air enters the channel from chamber 42 and flows through the space between the corrugation ridges and valleys of adjacent sheets. The air is then exhausted through exhaust ports 44. When water is introduced symmetrically about centre line 91 by water distributors 50, into the wet channel so formed, half of the water enters a wet channel with the corrugation bias in one direction; the other half enters with the corrugation bias in the opposite direction. Thus there is no tendency for all the water to flow towards one of exhaust spaces 44 rather than the other. Wetting is more uniform, and excess water flow from the exhaust ports 44 can be kept to manageable levels.

The construction of an indirect evaporative cooler as herein described and exemplified by the embodiments shown in the drawings enables such a cooler to be made in which the channel elements are horizontal or approximately so, and ultimate cooling capacity of the cooler is determined by the height of the heat exchanger stack. Thus a compact cooler can be constructed which has minimal projection from, say, a wall on which it is mounted. The preferred method of distributing water to the wet channels of the heat exchanger stack allows for reliable, periodic wetting of the channel surfaces with provision or capacity for the flushing of contaminants.

The invention claimed is:

1. A counter flow indirect evaporative heat exchanger wherein vertically adjacent counter flow wet and dry passages are, when in situ, horizontal or near to horizontal and the wet passages being wetted by wetting means and dry passages constructed to prevent being wetted by wetting means by the flow of air from the dry passages toward the wetting means, the wetting means sequentially applying which applies water elongately to the wet passages across the height of the heat exchanger, wherein the wetting means includes a water delivery device which travels generally vertically of the heat exchanger delivering water directly into a small plurality of the total number of passages at a time along an air delivery face of the heat exchanger.

2. The heat exchanger as claimed in claim 1, wherein said water delivery device comprises a plurality of tubes having slots in the tubes facing toward the air delivery face, and wherein a plunger is adapted to traverse up and down each slotted tube such that as water is delivered into the top of each tube the location of the plunger in each tube defines where water is delivered from each tube to wet passages of the heat exchanger.

3. The heat exchanger as claimed in claim 2, including cavity spaces or recesses along the air delivery face shaped to fit the slotted tubes to thereby contain water delivered to the heat exchanger passages.

4. The heat exchanger as claimed in claim 1, wherein the wetting means comprises a vertically moveable water spreader adapted to wet a small plurality of a total number of passages at a time along an air delivery face of the heat exchanger.

5. The heat exchanger as claimed in claim 4, wherein vertical movement of the water spreader is continuous during a wetting cycle.

6. The heat exchanger as claimed in claim 4, wherein water is continuously dispensed by the water spreader during a wetting cycle.

* * * * *